(12) United States Patent
Hancock et al.

(10) Patent No.: US 9,100,468 B2
(45) Date of Patent: Aug. 4, 2015

(54) METHOD AND SYSTEM OF CONTROLLING STATE OF DEVICES OPERABLE TO SUPPORT CALLS BETWEEN ENDPOINTS

(71) Applicant: Cable Television Laboratories, Inc., Louisville, CO (US)

(72) Inventors: David Hancock, Broomfield, CO (US); Jean-Francois Mulé, San Francisco, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 13/954,565

(22) Filed: Jul. 30, 2013

(65) Prior Publication Data

US 2013/0315086 A1    Nov. 28, 2013

Related U.S. Application Data

(63) Continuation of application No. 12/965,151, filed on Dec. 10, 2010, now Pat. No. 8,520,504.

(51) Int. Cl.
*H04L 12/66* (2006.01)
*G01R 31/08* (2006.01)
*H04M 7/00* (2006.01)
*H04M 3/22* (2006.01)

(52) U.S. Cl.
CPC ............. *H04M 7/0081* (2013.01); *H04L 12/66* (2013.01); *H04M 3/22* (2013.01)

(58) Field of Classification Search
CPC ........... H04M 15/00; H04M 7/00; H04J 1/16; H04J 3/14
USPC ................. 370/400, 401, 218, 216, 220, 217, 370/242–245, 352, 356; 379/208.01, 379/221.02, 113, 115, 219, 220, 221–224, 379/229–230
See application file for complete search history.

(56) References Cited

U.S. PATENT DOCUMENTS

| | | | | |
|---|---|---|---|---|
| 6,570,855 | B1 * | 5/2003 | Kung et al. | 370/237 |
| 8,018,848 | B2 * | 9/2011 | Baker et al. | 370/230 |
| 8,325,740 | B2 * | 12/2012 | Kok et al. | 370/401 |
| 8,520,504 | B2 * | 8/2013 | Hancock et al. | 370/216 |
| 2010/0128599 | A1 * | 5/2010 | Nishiyama | 370/218 |

* cited by examiner

*Primary Examiner* — Hanh N Nguyen
(74) *Attorney, Agent, or Firm* — Great Lakes Intellectual Property, PLLC

(57) ABSTRACT

A method and system of controlling state for devices operable to support signaling or sessions between endpoints, such as the type used to support phone, video, messaging, and other calls. The state control may include transitioning the device between in-service and out-of-service states as a function of current, past or future operating demands on the devices.

13 Claims, 2 Drawing Sheets

METHOD AND SYSTEM OF CONTROLLING STATE OF DEVICES OPERABLE TO SUPPORT CALLS BETWEEN ENDPOINTS

CROSS-REFERENCE TO RELATED APPLICATIONS

This application is a continuation of U.S. application Ser. No. 12/965,151 filed Dec. 10, 2010, the disclosure of which is incorporated in its entirety by reference herein.

TECHNICAL FIELD

The present invention relates to methods and systems of controlling state for devices operable to support calls, messaging, and/or streaming dependent signaling between endpoints, such as but not limited to controlling the devices to an in-service (IS) state and an out-of-service (OOS) state.

BACKGROUND

Public switched telephone networks (PSTNs) and other circuit-switched networks have been used to support telephony service related transmissions, such as but not limited those associated with supporting voice, video, facsimile, and data services. New networks and communications standards have been developed to support similar services, and in some cases additional services, through packet-switched operations. Networks used for circuit-switched communications may be referred to as circuit-switched networks while networks used for packet-switched communication may be referred to as packet-switched networks. The same networks may, in some cases, be used to support circuit and packet-switched communications.

A soft switch, cable modem, embedded enterprise SIP gateway (ESG), public branch exchange (PBX), or other device, collectively referred interchangeably herein as a gateway, may be used to facilitate signal conversions, protocol translations, and other operations necessary to exchange telephony and non-telephony signaling between endpoints where one endpoint is connected to a circuit-switched network and the other endpoint is connected to a packet switched network. Such a gateway may also be used to support signaling between similar packet or circuit switched networks, such as when one of the endpoints is connected to a private network or branch where all communications to that endpoint are serviced through the gateway.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
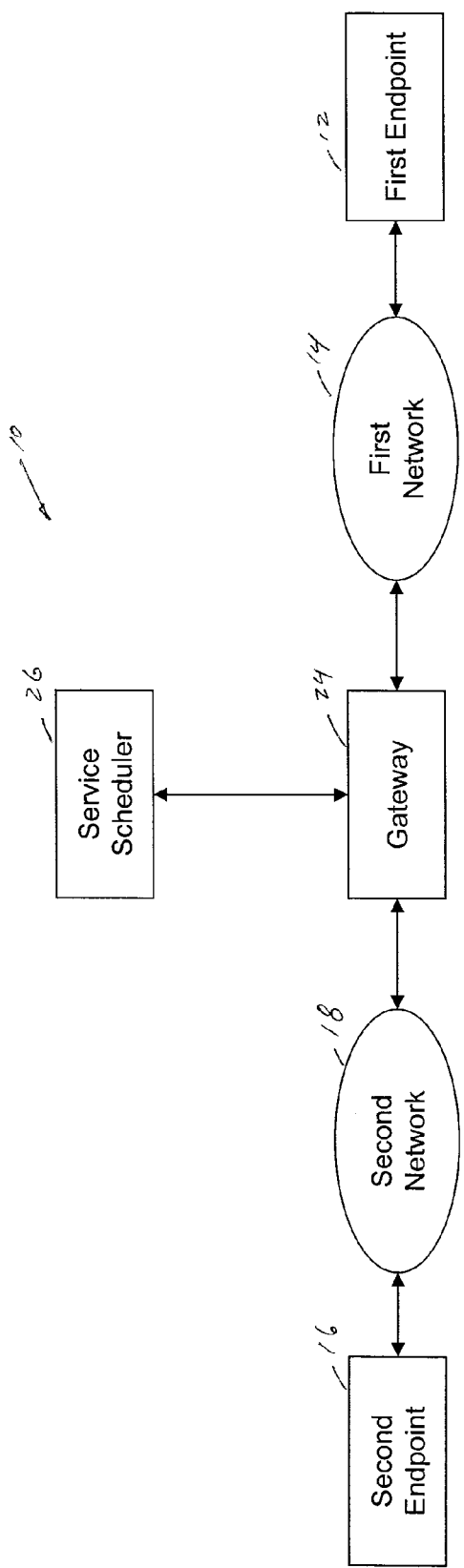
FIG. 1 illustrates a system operable for supporting signaling services in accordance with one non-limiting aspect of the present invention.

FIG. 1 illustrates a system 10 operable for supporting telephony services in accordance with one non-limiting aspect of the present invention. The system 10 is illustrated for exemplary and non-limiting purposes with respect to supporting telephony services between a first one of a plurality of endpoints 17 connected to a first network 14 and a second one of a plurality of endpoints 16 connected to a second network 18. This type of connection scenario may occur when the first endpoint 12 is connected to a packet-switched network 14, such as a private network 14 of a business, and the second endpoint 16 is connected to a circuit or packet-switched network 18, such as a plain to telephone (POT) network 18, a public switched telephone network (PSTN) 18, or the Internet 18. The present invention is not limited to the illustrated arrangement and fully contemplates facilitate telephony and non-telephony related signaling between the same or different networks 14, 18.

A gateway 24 may be interconnected between the first and second networks 14, 18 to act as a processing element operable to facilitate signal exchanges between each endpoint 12, 16. The gateway 24 is described with respect to being a public branch exchange (PBX) type device operable to manage wireline and wireless, telephony services and related signaling for multiple endpoints 12 connected to the first network 14, such as a device kept on-site at a business or other location to service phone calls between endpoints 12 at that location, and when necessary, to service phone calls with endpoints 16 connected outside that location to other networks 18. The gateway 24 is described with respect to supporting voice phone calls between the first and second endpoints 12, 16 but the present invention fully contemplates the gateway 24 supporting other types of calls, such as video, messaging, etc., where a call or other session is required between two or more endpoints 12, 16.

The gateway 24 may periodically require servicing, software/hardware updates, and other operations necessitating its removal from service. A service scheduler 26 associated with a system operator (MSO) or other entity responsible for servicing or otherwise controlling operations to the gateway 24 may be operable to facilitate servicing of the gateway 24 or multiple gateways 24 in the event the service provider supports operations for a plurality of gateways 24. Since the gateway 24 is unable to support telephony signaling between the first and second endpoints 12, 16 when removed from service and any calls occurring at the time of removal are released, the service scheduler 26 may be operable to schedule gateway 24 removals during a desired servicing interval, e.g., when no phone calls are being support or usage it at a low point. The service scheduler 26 may monitor current and/or historical signaling traffic of the gateway 24 in order to facilitate scheduling the servicing thereof. The service scheduler 26 may optionally add another gateways 24 to service or otherwise re-route signaling of the gateway 24 to another device in order to maintain supported services while the gateway 24 is removed from service.

The service scheduler 26 may be operable to facilitate gateway servicing by dispatching a technician to the location of the gateway 24. The technician can then physically remove the gateway 24 from service to perform the necessary service, such as by disconnecting it from the first network 14 and/or its power source. The service scheduler 26 may be configured to coordinate service schedules of a plurality of technicians so that an appropriate technician is available to remove the gateway 24 from service during the desired servicing interval. The service scheduler 26 may be operable to transmit electronic messages or to otherwise execute communications with technicians assigned to remove and service the gateway 24. The service scheduler 26 may also receive electronic feedback from the technicians regarding progress and/or success of the servicing operations, which may be tabulated and stored within a memory database.

The service provider 26 may include a transceiver and/or processor (not shown) operable to remove the gateway 24 from service with remote communications. The service scheduler 26 communications may be sufficient to instruct and control the gateway 24 through messaging or other signaling rather than dispatching a technician to the gateway's location. The service scheduler 26, for example, may schedule removal of the gateway 24 from services based on exchanged messages indicating gateway call activity has decreased to an acceptable level or that some other authorized triggering event has occurred. The service scheduler 26 may await receipt of a notification message from the gateway 24 indicating the number of active calls to be zero or the triggering event (time of day, emergency, etc.) has occurred before issuing a subsequent removal message to instruct the gateway 24 to remove itself from service and to perform related updating.

The service scheduler 26 may be operable to instruct the gateway 24 to monitor phone call activities or operating characteristics and to remove itself from service for the noted reasons and/or for monitorable events that occur too quickly for back and forth communications with the service scheduler 26. This type of self-directed removal may be accomplished without the gateway 24 having to issue the notification messages and/or without the gateway 24 awaiting receipt of the removal messages from the service scheduler 26. The gateway 24, instead, may be instructed in advance of the triggering event to remove itself from service upon subsequent occurrence of the trigger event. This self-directed removal may be helpful in preventing new phone calls from being supported during the period of time that otherwise would occur between the gateway 24 issuing the notification message and receiving the removal message from the service scheduler 26.

Figure 2:
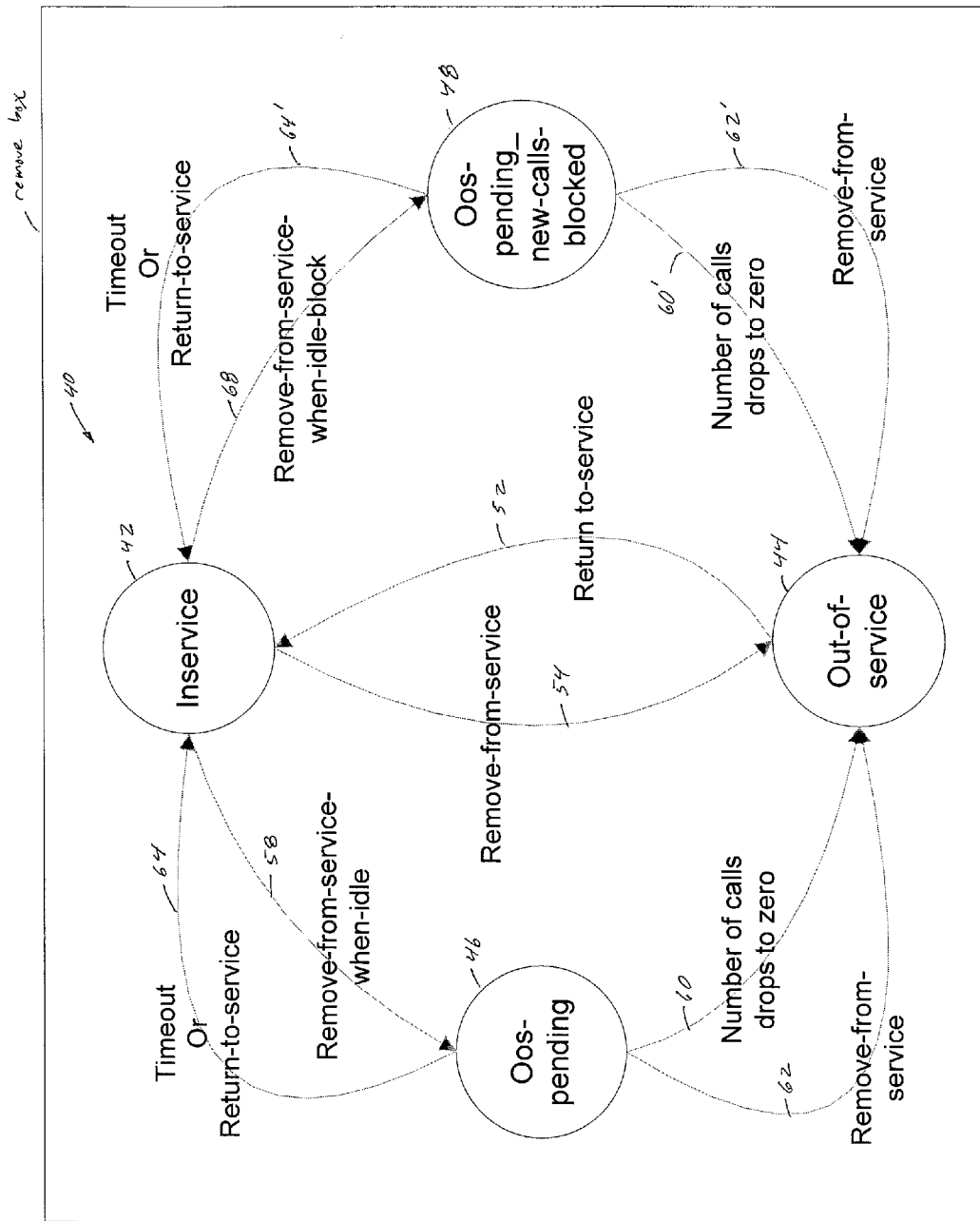
FIG. 2 illustrates a state diagram in accordance with one non-limiting aspect of the present invention.

FIG. 2 illustrates a state diagram 40 in accordance with one non-limiting aspect of the present invention. The state diagram 40 represents possible states that may be used to control the gateway 24 or other similarly functioning device to achieve one or more of the operations contemplated by the present invention. The state diagram 40 indicates the gateway 24 being operable between an in-service (IS) state 42, an out-of-service (OOS) state 44, an OOS-pending (DOSP) state 46, and an OOS-pending-new-calls-blocked state (OOSPNB) state 48. The present invention is not intended to be limited to the illustrated states 42, 44, 46, 48 or strictly to the illustrated state transitions as the present invention fully contemplates the use of more or less states 42, 44, 46, 48 and other transitions to achieve the self-directed removal process contemplated by one non-limiting aspect of the present invention.

The IS state 42 corresponds with the typical operating state of the gateway 24. The typical operating state 42 allows the gateway 24 to support signaling between multiple endpoints 12, 16, such as to support voice, video, data, and session-based services. The endpoints 12, 16 may be connected to the same first network 14 or elsewhere to the second network 18.

The OOS state 44 corresponds with the gateway 24 being removed from service and otherwise unable to normally support signaling between endpoints 12. 16. One non-limiting aspect of the present invention contemplates controlling the transitioning of the gateway between the IS and OOS states 42, 44. A return-to-service transition 52 and a return-from-service transition 54 are shown to illustrate transition scenarios where with the gateway 24 is instructed to immediately transition between one of the IS and OOS states 42, 44. The transitions 52, 54 may be implemented immediately with the service scheduler 26 transmitting a corresponding message to the gateway 24 and/or a technician physically inputting a corresponding input to the gateway 24.

The ability to directly transition the gateway 24 between IS and OOS states 42, 44 may be beneficial in situations in which timing of the transition is important, such as during an emergency or when reliance on future occurrence of other conditions is undesirable. The transitioning between the IS and OOS states 42, 44 may be accomplished without such immediacy with transitioning through one of the DOSP and OOSPNB states 46, 48. The DOSP and OOSPNB states 46, 48 may be considered as 'waiting' or 'pending' states in which the gateway 24 monitors one or more of its operating conditions in anticipation of a certain triggering event defined by the service scheduler 26 to occur prior to transition to the OOS state 44, or in some cases, back to the IS state 42. The service scheduler 26 or technician may program the gateway 24 in advance of the triggering event to automatically undertake the illustrated transitions without having to confirm or await further instructions.

A remove-from-service-when-idle transition 58 occurs when the gateway 24 transitions from the IS state 42 to the DOSP state 46 to await a triggering event reflective of an idle condition. The gateway 24 may monitor the number of phone calls being supported, messaging transfers, session requests, and other conditions to determine when the idle sate occurs. One transition 60 relates to the gateway 24 determining the idle state when the number of phone calls drops to zero. The transition 60 may be beneficial in insuring no phone calls are dropped with the transition to the OOS state 44. Optionally, a remove-from-service transition 62 may direct the gateway 24 to the OOS state 44 in advance of the idle state, such as in response to an override event, e.g., emergency or direct message from the service scheduler 26 or technician. Another option may include a timeout or return-to-service transition 64 where the gateway 24 transitions back to the IS state 42 in the event time period has elapsed prior to occurrence of the triggering event or receipt of a corresponding override message.

A remove-from-service-when-idle-block transition 68 is similar to the remove-from-service-when-idle transition 58 at least in so far as transitioning the gateway 24 to a 'waiting' state 48 where transitions matching the similarly labeled transitions 60', 62', 64' from the DOSP state 46 may be used to transition from the OOSPNB state 48 to the IS and OOS states 42, 44. The remove-from-service-when-idle-block transition 68 further restricts activities of the gateway 24 while it awaits occurrence of the idle triggering event. The illustrated example relates to the gateway 24 blocking future phone calls while it awaits occurrence of the triggering event. This may be beneficial in eliminating the possibility of a continuous supply of new phone calls preventing the gateway 24 from ever transitioning to the OOS state 44. Optionally, the OOSPNB state 48 may permit emergency calls or other priority/override (operator) calls to be serviced while blocking other lower priority calls.

The blocking of new phone calls in OOSPNB state 48 and/or the transitions 54, 62, 62' to the OOS 44 while phone calls are active, causing the active phone calls to be dropped, may be accompanied with a message or other notification to the corresponding participants. The notifications may be used to apprise the participants of why the phone calls are being dropped or blocked, time remaining until call drop, and/or when service is expected to be restored. Other options may also be integrated in to the illustrates state transitions, such as assessing other conditions, besides the number of phone calls, in determining whether to transition from the DOSP and OOSPNB states 46, 48 to the OOS state 44. These other conditions may include the type of phone call or session being service. Longer duration calls, such as facsimiles and data downloads, may be used to define the period to time that must elapses prior to implementing one of the timeout or remove from service transitions 62, 62', 64, 64' such that longer periods may be provided when the gateway 24 is servicing sessions recognized as having longer durations or customer subscriber to higher quality of service (QOS) levels.

One non-limiting aspect of the present invention contemplates providing a mechanism that enables a SIP Service Provider (SSP) to gracefully remove an element in a network from service when the element is inserted in the signaling and media path and providing end-to-end connectivity for one or more active sessions. A non-limiting example of such an element is a SIP Application Layer Gateway that relays SIP signaling messages and RTP media packets for voice calls to/from a group of SIP endpoints. For example, a DOCSIS Cable Modem can contain an embedded Enterprise SIP Gateway (ESG). The ESG can play multiple roles, including that of a SIP-aware Firewall that polices the access of enterprise users to the SSP network. In this role, the ESG can monitor the SIP signaling for establishing calls between the SSP and an Enterprise network, and allow RTP to be exchanged across the access network for active calls. It can also limit the total number of simultaneous calls between the SSP and Enterprise networks based on the Service Level Agreement between the SSP and Enterprise.

The SSP can be operable to issue administrative commands to remove the ESG from service, such as to download a new software image, or to provision a new attribute that requires an ESG reboot in order to take affect. When the ESG is removed from service, it can release all active calls, and while out-of-service, it can block establishment of new calls. In the event removal of the ESG from service is time critical; i.e., where the SSP wants the ESG to be removed from service immediately, even though it may cause active calls to fail, the SSP can issue a command that forces the ESG to transition to an out-of-service state immediately, independent of the current call activity.

Alternatively, there are cases where the timing of the removal from service is not time-critical; i.e., cases where the SSP would prefer to delay the removal from service in order to avoid disrupting active calls. To this end, the SSP can monitor the active call state by periodically sending a "report number of active calls" query to the ESG. Once the ESG reported that there are no active calls, the SSP can immediately remove the ESG from service. This mechanism may lack certain efficiencies as it requires multiple query/response transactions. Since the number of active calls is sampled at discrete points in time, there is a potential of missing an interval when the number of calls drops to zero. This can lead to a race condition where a new call can be established between the reporting of zero-calls and the subsequent removal of service, requiring the process to be extended further.

One non-limiting aspect of the present invention contemplates an arrangement where a single command may be used to cause the ESG to monitor the active-call state and autonomously remove itself from service once the number of active calls drops to zero. Once removed from service, the ESG may automatically instigate an update process where its software is updated autonomously and/or it may request the service scheduler to provide addition software and code for installation as part of a re-boot process.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A gateway operable to service calls between a plurality of endpoints, the gateway being operable to:
    an in-service (IS) state where the gateway is enabled to service calls between the plurality of endpoints;
    an out-of-service (OOS) state where the gateway is disabled from servicing calls;
    a pending state where the gateway monitors one or more operating characteristics to determine occurrence of a trigger event, including automatically transitioning from the IS state to the OOS state upon occurrence of the trigger event; and
    determine the triggering event while operating according to the pending state when a number of calls actively being serviced through the gateway drops to zero, thereby enabling the gateway to continue servicing calls existing at a time of entering the pending state.

2. The gateway of claim 1 further being operable, as at least part of the pending state, to an out-of-service pending new calls blocked state wherein existing calls are permitted to complete and new calls are blocked.

3. The gateway of claim 1 further being operable to:
    define the triggering event according to instructions received from a service scheduler in advance of the triggering event; and
    transmit a notification message to the service scheduler indicating occurrence of the triggering event if operating according to the pending state.

4. The gateway of claim 3 further being operable to transition from the pending state to the OOS state prior to transmitting the notification message to the service scheduler.

5. The gateway of claim 1 further operable to prevent automatically transitioning from the pending state to the OOS state upon occurrence of the trigger event if the triggering event occurs while in the IS state.

6. The gateway of claim 1 wherein the IS state includes ignoring occurrence of the triggering event, thereby preventing automatic transitioning from the IS state to the OOS state, unless the triggering event occurs while the pending state is active.

7. A gateway operable to service calls between a plurality of endpoints, the gateway operable to
  an in-service (IS) state where the gateway is enabled to service calls between the plurality of endpoints;
  an out-of-service (OOS) state where the gateway is disabled from servicing calls;
  a pending state where the gateway monitors one or more operating characteristics to determine occurrence of a trigger event, including automatically transitioning from the IS state to the OOS state upon occurrence of the trigger event; and
  notify participants when operating according to the pending state and prior to occurrence of the trigger event that each call associated therewith will be dropped at a time in the future corresponding with transitioning from the pending state to the OOS state.

8. A non-transitory computer-readable medium having a plurality of instructions sufficient for controlling state of a gateway operable to service wireline and/or wireless phone calls between a first plurality of endpoints connected to a first network and a second plurality of endpoints connected to a second network, the non-transitory computer-readable medium including instructions sufficient for:
  instructing the gateway to automatically transition from an in-service (IS) state to an out-of-service (OOS) state upon detecting occurrence of a triggering event if a pending state is active, the gateway supporting phone call required signaling between the first and second plurality of endpoints when in the IS state and preventing phone call required signaling between the first and second plurality of endpoints when in the OOS state;
  controlling the gateway to remain in the IS state upon detecting occurrence of the triggering event if the pending state is inactive; and
  defining the triggering event to occur when a number of calls being supported through the gateway drops to zero, including transitioning to the OOS state if the number of phone calls drops to zero while in the pending state and remaining in the IS state if the number of phone calls drops to zero while in the IS state.

9. The non-transitory computer-readable medium of claim 8 further comprising instructions sufficient for instructing the gateway while in the pending state to notify participants that new phone calls are being temporarily blocked.

10. A non-transitory computer-readable medium having a plurality of instructions sufficient for controlling state of a gateway operable to service wireline and/or wireless phone calls between a first plurality of endpoints connected to a first network and a second plurality of endpoints connected to a second network, the non-transitory computer-readable medium comprising non-transitory instructions sufficient for:
  instructing the gateway to automatically transition from an in-service (IS) state to an out-of-service (OOS) state upon detecting occurrence of a triggering event if a pending state is active, the gateway supporting phone call required signaling between the first and second plurality of endpoints when in the IS state and preventing phone call required signaling between the first and second plurality of endpoints when in the OOS state;
  controlling the gateway to remain in the IS state upon detecting occurrence of the triggering event if the pending state is inactive;
  defining the triggering event to occur when a number of calls being supported through the gateway drops to zero; and
  instructing the gateway to block new phone calls and to continue supporting existing phone calls during a period of time in which the gateway is in the pending state waiting for the number of phone calls to drop to zero.

11. A non-transitory computer-readable medium having a plurality of instructions sufficient for controlling state of a gateway operable to service wireline and/or wireless phone calls between a first plurality of endpoints connected to a first network and a second plurality of endpoints connected to a second network, the non-transitory computer-readable medium comprising non-transitory instructions sufficient for:
  instructing the gateway to automatically transition from an in-service (IS) state to an out-of-service (OOS) state upon detecting occurrence of a triggering event if a pending state is active, the gateway supporting phone call required signaling between the first and second plurality of endpoints when in the IS state and preventing phone call required signaling between the first and second plurality of endpoints when in the OOS state;
  controlling the gateway to remain in the IS state upon detecting occurrence of the triggering event if the pending state is inactive; and
  instructing the gateway while in the pending state to drop each phone call in the event the number of phone calls fails to drop to zero within a predefined period of time, and thereafter, to transition to the OOS state.

12. A non-transitory computer-readable medium having a plurality of instructions sufficient for controlling state of a gateway operable to service wireline and/or wireless phone calls between a first plurality of endpoints connected to a first network and a second plurality of endpoints connected to a second network, the non-transitory computer-readable medium comprising non-transitory instructions sufficient for:
  instructing the gateway to automatically transition from an in-service (IS) state to an out-of-service (OOS) state upon detecting occurrence of a triggering event if a pending state is active, the gateway supporting phone call required signaling between the first and second plurality of endpoints when in the IS state and preventing phone call required signaling between the first and second plurality of endpoints when in the OOS state;
  controlling the gateway to remain in the IS state upon detecting occurrence of the triggering event if the pending state is inactive; and
  instructing the gateway with an override that forces the gateway to transition from the pending state to the OOS state prior to occurrence of the triggering event.

13. A gateway operable to service calls between a plurality of endpoints, the gateway operable to:
  an in-service (IS) state where the gateway is enabled to service calls between the plurality of endpoints;
  an out-of-service (OOS) state where the gateway is disabled from servicing calls;
  a pending state where the gateway monitors one or more operating characteristics to determine occurrence of a trigger event, including automatically transitioning from the IS state to the OOS state upon occurrence of the trigger event;
  transition from the IS state to the pending state according to a transition instruction remotely received from a service scheduler or locally received from a technician;
  remain in the IS state in the absence of the transition instruction; and transition from the pending state back to the IS state after receiving the transition instruction if a timeout is determined while operating according to the pending state, the timeout defining a time period for the triggering event to occur while operating according to the pending state in order to automatically transition to the OOS state.

* * * * *